US011610069B2

(12) United States Patent
Grail et al.

(10) Patent No.: US 11,610,069 B2
(45) Date of Patent: Mar. 21, 2023

(54) TRAINING A QUESTION ANSWERING NETWORK USING RELATIONAL LOSS

(71) Applicant: Naver Corporation, Gyeonggi-do (KR)

(72) Inventors: Quentin Grail, Meylan (FR); Julien Perez, Grenoble (FR)

(73) Assignee: Naver Corporation

( * ) Notice: Subject to any disclaimer, the term of this patent is extended or adjusted under 35 U.S.C. 154(b) by 389 days.

(21) Appl. No.: 16/889,920

(22) Filed: Jun. 2, 2020

(65) Prior Publication Data

US 2021/0192149 A1 Jun. 24, 2021

Related U.S. Application Data

(60) Provisional application No. 62/951,606, filed on Dec. 20, 2019.

(51) Int. Cl.
*G06F 40/40* (2020.01)
*G06N 3/04* (2023.01)
*G06N 3/08* (2023.01)

(52) U.S. Cl.
CPC .............. *G06F 40/40* (2020.01); *G06N 3/04* (2013.01); *G06N 3/08* (2013.01)

(58) Field of Classification Search
CPC ...... G06F 40/40; G06F 16/3344; G06F 40/30; G06N 3/04; G06N 3/08; G06N 3/0481; G06N 3/0427; G06N 3/0445; G06N 3/0454; G06N 5/041
See application file for complete search history.

(56) References Cited

U.S. PATENT DOCUMENTS

| 10,599,924 | B2* | 3/2020 | Yang | G06V 10/82 |
|---|---|---|---|---|
| 2017/0103324 | A1* | 4/2017 | Weston | G06F 16/285 |
| 2018/0114108 | A1* | 4/2018 | Lao | G06N 3/006 |
| 2020/0242444 | A1* | 7/2020 | Zhang | G06N 3/006 |

OTHER PUBLICATIONS

Hudson et al. "GQA: a new dataset for compositional question answering over real-world images". arXiv: 1902.09506v1 [cs.CL] Feb. 25, 2019 (Year: 2019).*
Lubatov et al. "Multi-Relational Question Answering from Narratives: Machine Reading and Reasoning in Simulated Words". arXiv: 1902.09093v1 [cs.CL] Feb. 25, 2019 (Year: 2019).*

(Continued)

*Primary Examiner* — Jesse S Pullias

(57) ABSTRACT

There is disclosed a computer implemented method that includes accessing a dataset having (1) a first set of questions including at least one pair of relational questions that correspond respectively with a pair of binary answers and (2) a second set of questions including at least another pair of relational questions that correspond respectively with a binary answer and a scalar answer. A question answering network is used to compute both a relational loss for the at least one pair of relational questions, and a relational loss for the at least another pair of relational questions. Both the relational loss for the at least one pair of relational questions and the relational loss for the at least another pair of relational questions are optimized, and a neural network model is trained with the optimized relational losses.

20 Claims, 5 Drawing Sheets

(56) References Cited

OTHER PUBLICATIONS

Nishida et al. "Retreive-and-Read: Multi-task Learning of Information Retrieval and Reading Comprehension" CIKM '18, Oct. 22-26, 2018, Torrino, Italy (Year: 2018).*
Bordes, Antoine; Nicolas Usunier; Alberto Garcia-Duran; Jason Weston; and Oksana Yakhnenko; 'Translating Embeddings for Modeling Multi-Relational Data'; in Advances in Neural Information Processing Systems 26, edited by C. J. C. Burges, L. Bottou, M. Welling, Z. Ghahramani, and K. Q. Weinberger, pp. 2787-2795; Curran Associates, Inc., 2013.
Chen, Danqi; Adam Fisch; Jason Weston; and Antoine Bordes; 'Reading Wikipedia to Answer Open-Domain Questions'; in Proceedings of the 55th Annual Meeting of the Association for Computational Linguistics vol. 1: Long Papers), pp. 1870-1879; Vancouver, Canada: Association for Computational Linguistics, 2017.
Gehring, Jonas; Michael Auli; David Grangier; and Yann N. Dauphin; 'A Convolutional Encoder Model for Neural Machine Translation'; arXiv: 1611.02344 [Cs], Jul. 24, 2017; arxiv.org/abs/1611.02344.
Grail, Quentin; and Julien Perez; 'Differentiable Consistency Loss in Machine Reading Comprehension', poster at EurNLP2019, in London, Oct. 11, 2019.
Grail, Quentin; and Julien Perez; 'ReviewQA: a relational aspect-based opinion reading dataset' arXiv: 1810.12196 [cs.CL]; Oct. 29, 2018; arxiv org/abs/1810.12196.
He, Wei; Kai Liu; Jing Liu; Yajuan Lyu; Shiqi Zhao; Xinyan Xiao; Yuan Liu; Tian Wu; and Haifeng Wang; 'DuReader: A Chinese Machine Reading Comprehension Dataset from Real-World Applications'; In Proceedings of the Workshop on Machine Reading for Question Answering, 37-46. Melbourne, Australia: Association for Computational Linguistics, 2018; doi.org/10.18653/v1/W18-2605.
Hermann, Karl Moritz; Tomas Kocisky; Edward Grefenstette; Lasse Espeholt; Will Kay; Mustafa Suleyman; and Phil Blunsom; 'Teaching Machines to Read and Comprehend'; in Advances in Neural Information Processing Systems 28, edited by C. Cortes, N. D. Lawrence, D. D. Lee, M. Sugiyama, and R. Garnett, 1693-1701; Curran Associates, Inc., 2015.
Hochreiter, Sepp; and Jurgen Schmidhuber; 'Long short-term memory'; Neural Computation, vol. 9, Issue 8, pp. 1735-1780; Nov. 1997.
Hu, Minghao; Yuxing Peng; Zhen Huang; Xipeng Qiu; Furu Wei; and Ming Zhou; 'Reinforced Mnemonic Reader for Machine Reading Comprehension'; arXiv: 1705.02798 [Cs], Jun. 5, 2018; arxiv.org/abs/1705.02798.
Hudson, Drew A.; and Christopher D. Manning; 'Compositional Attention Networks for Machine Reasoning', in Proceeding of Compositional Attention Networks for Machine Reasoning; 2018; openreview.net/forum?id=S1Euwz-Rb.
Jia, Robin; and Percy Liang; 'Adversarial Examples for Evaluating Reading Comprehension Systems'; in Proceedings of the 2017 Conference on Empirical Methods in Natural Language Processing, pp. 2021-2031 Copenhagen, Denmark: Association for Computational Linguistics, 2017.
Johnson, Justin; Bharath Hariharan; Laurens Van Der Maaten; Li Fei-Fei; C. Lawrence Zitnick and Ross Girshick; 'CLEVR: A Diagnostic Dataset for Compositional Language and Elementary Visual Reasoning'; in 2017 IEEE Conference on Computer Vision and Pattern Recognition (CVPR), pp. 1988-1997, 2017.
Kingma, Diederik P.; and Jimmy BA; 'Adam: A Method for Stochastic Optimization'; arXiv:1412.6980 [Cs], Jan. 29, 2017; arxiv.org/abs/1412.6980.
Koehn, Philipp; 'Europarl: A Parallel Corpus for Statistical Machine Translation', in Machine Translation Summit X, pp. 79-86, Phuket, Thailand, 2005.
Liu, Fei; and Julien Perez; 'Gated End-to-End Memory Networks'; in Proceedings of the 15th Conference of the European Chapter of the Association for Computational Linguistics: vol. 1, Long Papers, pp. 1-10; Valencia, Spain: Association for Computational Linguistics, 2017.
Pennington, Jeffrey; Richard Socher; and Christopher Manning; 'GloVe: Global Vectors for Word Representation'; in Proceedings of the 2014 Conference on Empirical Methods in Natural Language Processing (EMNLP), pp. 1532-1543; Doha, Qatar: Association for Computational Linguistics, Oct. 2014.
Rajpurkar, Pranav; Jian Zhang; Konstantin Lopyrev; and Percy Liang; 'SQuAD: 100,000+ Questions for Machine Comprehension of Text'; in Proceedings of the 2016 Conference on Empirical Methods in Natural Language Processing, pp. 2383-2392; Austin, Texas: Association for Computational Linguistics, 2016.
Sukhbaatar, Sainbayar; Arthur Szlam; Jason Weston; and Rob Fergus; 'End-To-End Memory Networks'; in NIPS'15: Proceedings of the 28th International Conference on Neural Information Processing Systems—vol. 2, edited by C. Cortes, N. D. Lawrence, D. D. Lee, M. Sugiyama, and R. Garnett, pp. 2440-2448. Curran Associates, Inc., Dec. 2015.
Tang, Duyu; Bing Qin; and Ting Liu; 'Aspect Level Sentiment Classification with Deep Memory Network'; in Proceedings of the 2016 Conference on Empirical Methods in Natural Language Processing, pp. 214-224. Austin, Texas: Association for Computational Linguistics, 2016.
Tay, Yl; Luu Anh Tuan; and Siu Cheung Hui; 'Dyadic Memory Networks for Aspect-Based Sentiment Analysis'; in Proceedings of the 2017 ACM on Conference on Information and Knowledge Management, pp. 107-116; Singapore: ACM, Nov. 2017.
Trischler, Adam; Tong Wang; Xingdi Yuan; Justin Harris; Alessandro Sordoni; Philip Bachman; and Kaheer Suleman; 'NewsQA: A Machine Comprehension Dataset'; in Proceedings of the 2nd Workshop on Representation Learning for NLP, pp. 191-200; Vancouver, Canada: Association for Computational Linguistics, 2017.
Wang, Hongning; Yue Lu; and Chengxiang Zhai; 'Latent Aspect Rating Analysis on Review Text Data: A Rating Regression Approach', in KDD '10: Proceedings of the 16th ACM SIGKDD international conference on Knowledge discovery and data mining, pp. 783-792, Jul. 2010.
Wang, Hongning; Yue Lu; and Chengxiang Zhai; 'Latent Aspect Rating Analysis without Aspect Keyword Supervision'; In Proceedings of the 17th ACM SIGKDD International Conference on Knowledge Discovery and Data Mining—KDD '11, pp. 618-626; San Diego, California, USA: ACM Press, Aug. 2011.
Wang, Wenhui; Nan Yang; Furu Wei; Baobao Chang; and Ming Zhou; 'Gated Self-Matching Networks for Reading Comprehension and Question Answering'; in Proceedings of the 55th Annual Meeting of the Association for Computational Linguistics (vol. 1: Long Papers), pp. 189-198; Vancouver, Canada: Association for Computational Linguistics, 2017.
Welbl, Johannes; Pontus Stenetorp; and Sebastian Riedel; 'Constructing Datasets for Multi-Hop Reading Comprehension Across Documents'; Transactions of the Association for Computational Linguistics; vol. 6, pp. 287-302, Dec. 2018.
Weston, Jason; Antoine Bordes; Sumit Chopra; Alexander M. Rush; Bart Van Merriénboer Armand Joulin; and Tomas Mikolov; 'Towards AI-Complete Question Answering: A Set of Prerequisite Toy Tasks'; arXiv: 1502.05698 [Cs, Stat], Dec. 31, 2015; arxiv.org/abs/1502.05698.
Yu, Adams Wei; David Dohan; Minh-Thang Luong; Rui Zhao; Kai Chen; Mohammad Norouzi; and Quoc V Le; 'Fast and Accurate Reading Comprehension By Combining Self-Attention And Convolution', Sixth International Conference on Learning Representations (ICLR), 2018.
Yu, Adams Wei; David Dohan; Minh-Thang Luong; Rui Zhao; Kai Chen; Mohammad Norouzi; and Quoc V. Le; 'QANet: Combining Local Convolution with Global Self-Attention for Reading Comprehension' arXiv:1804.09541 [cs.CL]; Apr. 23, 2018; arxiv.org/abs/1804.09541.

* cited by examiner

TRAINING A QUESTION ANSWERING NETWORK USING RELATIONAL LOSS

PRIORITY INFORMATION

The present application claims priority, under 35 USC § 119(e), from U.S. Provisional Patent Application, Ser. No. 62/951,606, filed on Dec. 20, 2019. The entire content of U.S. Provisional Patent Application, Ser. No. 62/951,606, filed on Dec. 20, 2019, is hereby incorporated by reference.

FIELD

The field of the disclosure relates to machine reading, and more particularly question answering using deep learning models.

BACKGROUND

Question answering systems automatically extract information from an unstructured source using natural language queries.

Answering questions about a document are depicted as a relevant proxy task to evaluate the reading quality of a given machine reading model. Several datasets have been proposed to build and evaluate reading models. Such datasets are described for example in the publication by Pranav Rajpurkar, Jian Zhang, Konstantin Lopyrev, and Percy Liang, entitled "Squad: 100,000+ questions for machine comprehension of text," published in the 2016 Conference on Empirical Methods on Natural Language Processing (EMNLP), and in the publication by Adam Trischler, Tong Wang, Xingdi Yuan, Justin Harris, Alessandro Sordoni, Philip Bachman, and Kaheer Suleman, entitled "Newsqa: A machine comprehension dataset," published in the 2nd Workshop on Representation Learning for NLP (Rep4NLP@ACL).

Generally, machine reading models for question answering are trained using a question (or query), a document (context) and an answer (a sentence in the document). During runtime, a question (or query) and a document (context) are received as input, and transformed into numeric vectors, and used as input to a prediction model that identifies a sentence of the input document that it predicts contains the answer to the question.

One limitation of such models results in adversarial perturbations in the input documents, as disclosed in the publication by Robin Jia and Percy Liang, entitled "Adversarial examples for evaluating reading comprehension systems" (herein after Jia et al.), and published in the 2017 Conference on Empirical Methods on Natural Language Processing (EMNLP). In this publication, the authors describe how machine reading models for question answering are subject to overstability, meaning that they fail to distinguish phrases with different meaning but where most of the words are the same.

Indeed, an adversarial example may be constructed so that it confuses machine learning models but does not contradict the correct answer or confuses humans. For example, machine learning models may be confused when an input document that contains the answer to a given question is modified to include a distracting sentence. As set out in the article by Jia et al.: (i) given the following paragraph (a) as input: "Peyton Manning became the first quarter-back ever to lead two different teams to multiple Super Bowls. He is also the oldest quarterback ever to play in a Super Bowl at age 39. The past record was held by John Elway, who led the Broncos to victory in Super Bowl XXXIII at age 38 and is currently Denver's Executive Vice President of Football Operations and General Manager."; and (ii) adding the following distracting sentence (b) to the end of the input paragraph (a): "Quarterback Jeff Dean had jersey number 37 in Champ Bowl XXXIV."; and (iii) a machine reading model would answer the following question (c): "What is the name of the quarterback who was 38 in Super Bowl XXXIII?" correctly (the answer being "John Elway"), when there is no distracting sentence (b) to the end of the input paragraph (a) but incorrectly (e.g., an incorrect answer being "Jeff Dean") when the distracting sentence (b) is added to the end of the input paragraph (a).

While machine learning models for question answering focus on detecting relevant passages in input documents, they tend to be unable to address overstability because they lack the ability of reasoning with relevant pieces of information extracted from input documents. Accordingly, there remains a need for improved training of machine reading models for question answering that are less subject to overstability.

SUMMARY

In one embodiment there is disclosed computer implemented method for improving an efficiency of training of a question answering network, the question answering network including a neural network. The method includes: accessing a dataset from a corpus, the dataset including a plurality of questions; wherein with the dataset includes (a) a first set of questions having at least one pair of relational questions with each of the at least one pair of relational questions corresponding respectively with a pair of binary answers, and (b) a second set of questions including at least another pair of relational questions with each of the at least another pair of relational questions corresponding respectively with a binary answer and a scalar answer; using the question answering network to compute a relational loss for the at least one pair of relational questions; using the question answering network to compute a relational loss for the at least another pair of relational questions; optimizing both the relational loss for the at least one pair of relational questions and the relational loss for the at least another pair of relational questions; and training the neural network model with both the optimized relational loss for the at least one pair of relational questions and the optimized relational loss for the at least another pair of relational questions.

In one example of the computer implemented method, optimizing includes successively optimizing the relational loss for the at least one pair of relational questions and the relational loss for the at least another pair of relational questions. The successive optimizing may include successively optimizing the relational loss for the at least one pair of relational questions at a first frequency and optimizing the relational loss for the at least another pair of relational questions at a second frequency. In particular, the at least one pair of relational questions may be optimized after a first selected number of epochs and the relational loss for the at least another pair of relational questions may be optimized after a second selected number of epochs.

In another example of the computer implemented method, the relational loss for at least one pair of relational questions is computed with the following function:

$$L_b(\theta) = \sum_{n=1}^{N} [(\hat{a}_{n,k}^1 + \hat{a}_{n,k}^2) - 1]^2 + [(\hat{a}_{n,l}^1 + \hat{a}_{n,l}^2) - 1]^2,$$

with $\hat{a}_i^j = \Phi_\theta(d_i, q_i^j) \in \mathbb{R}^V$, $i \in [0, N]$, $j \in \{1,2\}$ being the probability distribution of binary valued answers over an output vocabulary of size V produced by the binary consistency loss function, where:

N is the size of the training dataset,
$\Phi_\theta$ is the model,
$d_i$ is the i-th document of the training dataset,
$q_i^1$ and $d_i^2$ are the relational questions associated with document $d_i$,
k the index of the one-hot vector representing one value of the binary answer, and
l the index of the one-hot vector representing the other value of the binary answer.

In another example of the computer implemented method, the relational loss for at least another pair of relational questions is computed with the following function $$L_s(\theta) = \sum_{n=1}^{N} \exp(-\hat{a}_n^1 \times \hat{a}_n^2),$$

with $\hat{a}_i^j = \Phi_\theta(d_i, q_i^j) \in \mathbb{R}$, $i \in [0, N]$, $j \in \{1,2\}$ being the scalar prediction produced by the model, where:

N is the size of the training dataset,
$\Phi_\theta$ is the model,
$d_i$ is the i-th document of the training dataset,
$q_i^1$ and $q_i^2$ are the relational questions associated with document $d_i$.

In yet another example of the computer implemented method, cross entropy loss is computed for the question answering network and the training is further optimized with the cross entropy loss.

In yet another example, the computer implemented method further comprises regularizing the question answering network with both the relational loss for the at least one pair of relational questions and the relational loss for the at least another pair of relational questions.

In yet another example of the computer implemented method, the neural network is adapted to a projective setting in which position selection heads are replaced by a projection over a selected answer space.

In another example of the computer implemented method, the training includes using at least one filter with the filter successively overlapping a selected number of words.

BRIEF DESCRIPTION OF THE DRAWINGS

The drawings are only for purposes of illustrating various embodiments and are not to be construed as limiting, wherein.

In the drawings, reference numbers may be reused to identify similar and/or identical elements.

DETAILED DESCRIPTION

The present disclosure relates to a method for improving the efficiency of machine reading models for question answering using a consistency loss function. Even though machine reading models are commonly trained independently of each document/question pair, such models are expected to produce consistent answers regarding questions that have logical relationships with the same document, even if each question is asked independently. Advantageously, by enforcing the production of consistent answers using a consistency loss function, a machine reading model's reasoning capabilities for question answering may be improved.

According to the present disclosure, a method is disclosed for computing a consistency loss function for use with machine reading models for question answering. Advantageously, the addition of the consistency loss function to the learning process of the machine learning models improves the accuracy of such models when given related questions requiring consistent answers, as well as their overall accuracy by having such models reason over their input data, as opposed to having such models apply limited pattern detection.

A. System Architecture

Figure 1:
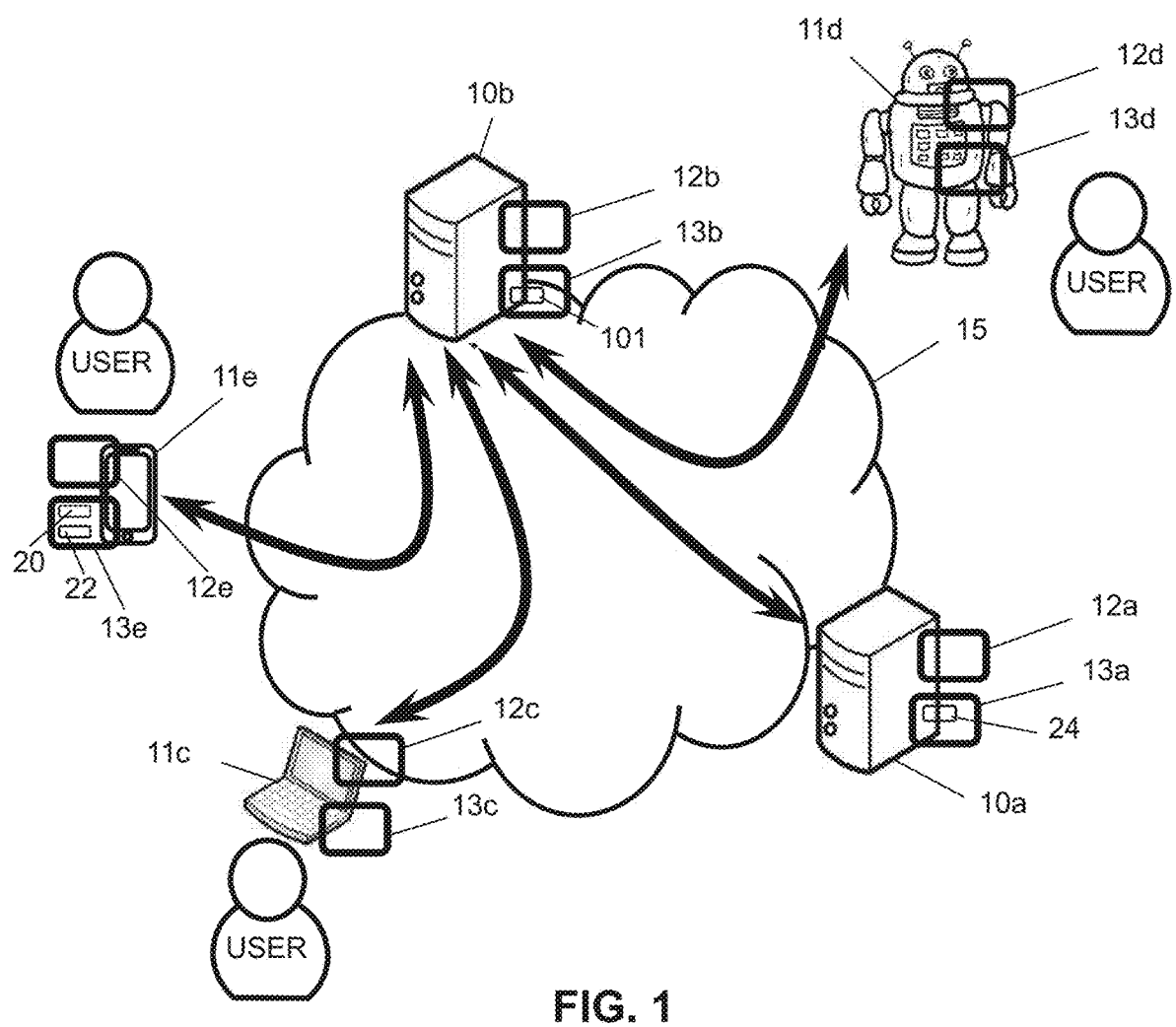
FIG. 1 illustrates an example of system architecture in which the methods for question answering may be performed.

The disclosed methods for training and using machine reading models using a relational loss function may be implemented within a system architecture such as that illustrated in FIG. 1, which includes a first server 10a and a second server 10b. In one embodiment, the first server 10a is a dataset server for storing a training dataset 24 (stored in memory 13a) and the second server 10b is a training and runtime server for implementing a method for training a machine reading model 101 (stored in memory 13b) and using at runtime the trained machine reading model 101.

TABLE 1

| Task ID | Description/Comment | Example Question | Expected Answer |
|---|---|---|---|
| 1 | Detection of an aspect in a review. The objective is to evaluate how well a model is able to detect whether an aspect is mentioned or not in a review. | Is sleep quality mentioned in this review? | Yes/No |
| 2 | Prediction of the customer general satisfaction. This task estimates how well a model is able to predict the overall positivity or negativity of a given review. | Is the client satisfied by this hotel? | Yes/No |

TABLE 1-continued

| Task ID | Description/Comment | Example Question | Expected Answer |
|---|---|---|---|
| 3 | Prediction of the global trend of an aspect in a given review. This task measures the satisfaction of a client per aspect. This is a precision over the last task since a client can be globally satisfied by a hotel but not satisfied regarding a certain aspect. | Is the client satisfied with the cleanliness of the hotel? | Yes/No |
| 4 | Prediction of whether the rating of a given aspect is above or under a given value. This task evaluates more precisely how the reader is able to infer the rating of an aspect | Is the rating of location under 4? | Yes/No |
| 5 | Prediction of the exact rating of an aspect in a review. This task evaluates the capability of a model to extract the satisfaction of a client regarding an aspect. | What is the rating of the aspect Value in this review? | A rating between 1 and 5 |
| 6 | Prediction of the list of all the positive/negative aspects mentioned in the review. Answering such question requires the system to detect all the aspects that are mentioned in the review and their associated polarity. This question type measures the capability of a model to filter positive and negative information. | Can you give me a list of all the positive aspects in this review? | a list of aspects |
| 7.0 | Comparison between aspects. This competency requires the model to understand the level of satisfaction of the user regarding the two mentioned aspects and to perform a comparison. | Is the sleep quality better than the service in this hotel? | Yes/No |
| 7.1 | | Which one of these two aspects, service, location has the best rating? | an aspect |
| 8 | Prediction of the strengths and weaknesses in a review. This is probably the hardest task of the dataset. It requires a complete and precise understanding of the review. To perform well on this task, a model should probably master all the previous tasks. | What is the best aspect rated in this comment? | an aspect |

The training dataset 24 includes input questions and true answers, One example of the training dataset 24 is the ReviewQA dataset which is described in the publication by Quentin Grail and Julien Perez. 2018, entitled "ReviewQA: a relational aspect-based opinion reading dataset", published on arXiv.org as arXiv:1810.12196, Oct. 29, 2018. In one example, ReviewQA is a set of natural language questions over hotel reviews. These questions may be divided into a plurality of groups relating to competencies to be answered by the machine reading model for question answering of the present disclosure. As contemplated, the competencies relate to tasks that the machine reading model for question answering should master in order to process reviews and text documents in general. Eight tasks requiring different competencies and different levels of understanding of a document to be answered is set out in Table 1.

In other embodiments, servers 10*a* and 10*b* may be merged or have reversed functionality. The servers 10*a* and 10*b* are typically remote computer equipment connected to an extended network 15 such as the Internet for data exchange. The system architecture in FIG. 1 advantageously comprises one or more items of client equipment 11, which may be any workstation 11*c*, robot 11*d*, or mobile device 11*e* (which are also connected to network 15), preferably separate from the servers 10*a*, 10*b* but possibly being merged with one and/or the other thereof. Each server 10*a*, 10*b* and client devices 11*c*, 11*d*, 11*e* comprises, respectively, data processing means 12*a*, 12*b*, 12*c*, 12*d*, 12*e* of processor type, and optionally storage means 13*a*, 13*b*, 13*c*, 13*d*, 13*e* such as a computer memory (e.g., a hard disk). The operators (i.e., "users") of client equipment 11 are typically "clients" in the commercial meaning of the term, of the service provider operating the first and/or second servers 10*a*, 10*b*.

B. Machine Reading Models for Question Answering

Generally, machine reading models for question answering (or question answering machines) rely on deep learning to extract an answer to an input question from an input text span. More specifically, a machine reading model for question answering 101 (shown in FIG. 1) may be implemented in a neural network taking a question and a text span as input. In one example, an applicable neural network may include: (a) an embedding layer, that transforms each word given as input into a vector representation; these embeddings may be obtained Word2vec embeddings, GloVe embeddings etc.; (b) an encoder layer, that takes embeddings as inputs and computes a vector representation for the question and another vector for the text span, and which may be performed using a Recurrent Neural Network (RNN) architecture; (c) one or more attention layers, that aim at identifying the important part in both the question and the text span; and (d) one or more output layers.

Referring to the RNN example, where the neural network is implemented as a recurrent projective reader, each sentence may be tokenized by words. Each token is then represented by the concatenation of its embedding vector and the final state of a bidirectional recurrent network over the characters of this word. Finally, another bidirectional RNN on the top of this representation produces the encoding of the document and the question.

In the recurrent projective reader, attention layers may include a question/document attention layer and a self-attention layer. The question/document attention layer may be applied to match the representation of the question with each token of the document individually. The resulting attention gives more weight to the important tokens of the document regarding the question.

The question/document attention layer provides a question-aware representation of the sentence, which representation is known to be mainly conditioned by its closest neighbor. To address the problem associated with such conditioning, Wang et al (*Gated Self-Matching Networks for Reading Comprehension and Question Answering* [*Association for Computational Linguistics*, 2017]) have proposed to use a self-attention layer that matches each individual token with all the other tokens of the document. By doing that, each token is conditioned with a sentence scale context.

Finally, in the output layer of the recurrent projective reader, with the bidirectional RNN applied to the top of the stack, the concatenation of the final states is used as the representation of the input. Accordingly, a fully connected layer projects this representation into the answer space to select the most probable answer.

Figure 2A:
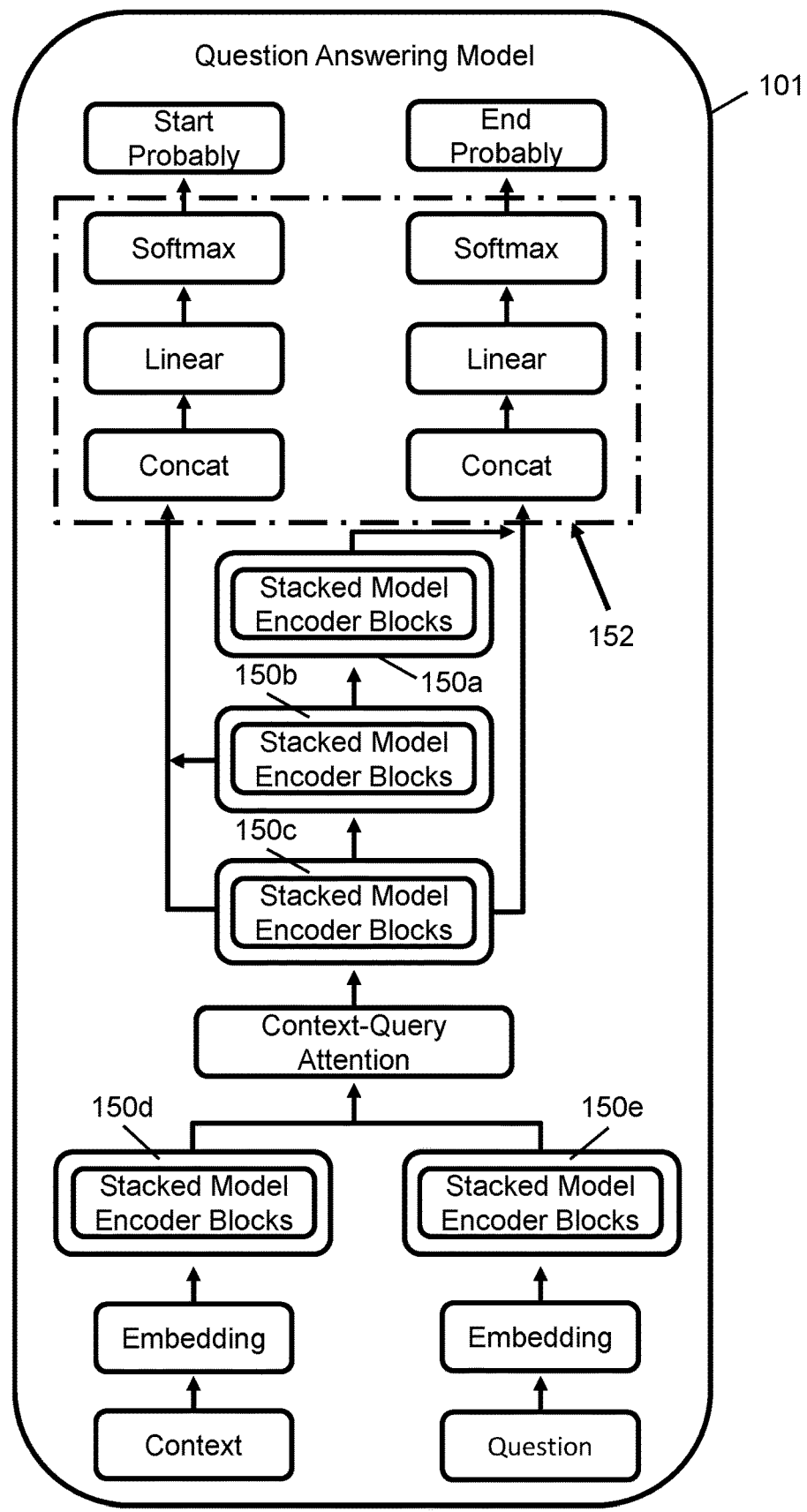
FIGS. 2A and 2B illustrate a schematic, diagrammatic view of an embodiment of the question answering model in FIG. 1 implemented using a QANet model.
Figure 2B:
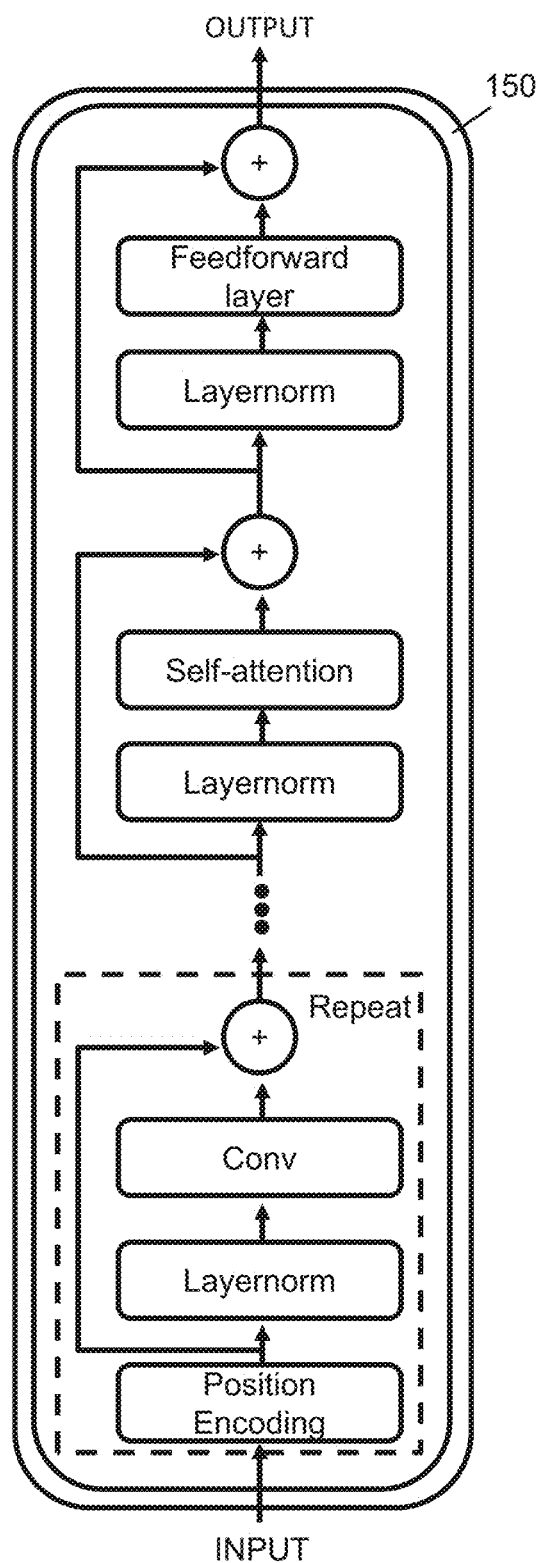

In another neural network implementation, a QANet model, as contemplated by Yu et al. (*QANet: Combining Local Convolution with Global Self-Attention for Reading Comprehension* [International Conference on Learning Representations, 2018b]) ("Yu et al. 2018b"), has been adapted to a projective setting. Referring to FIGS. 2A and 2B of an embodiment of machine reading model 101 in FIG. 1, a representation of the QANet architecture, as depicted in Yu et al. 2018b, is shown. The following abbreviated description of the QANet architecture of FIGS. 2A and 2B is provided in Yu et al., 2018b at p. 3:

> An overview of the QANet architecture [in FIG. 2A] which has several Encoder Blocks [150a-150e]. [The] same Encoder Block [150, which is shown in detail in FIG. 2B, is used] throughout the model, only varying the number of convolutional layers for each block. We use layernorm and residual connection between every layer in the Encoder Block [150 in FIG. 2B]. We also share weights of the context and question encoder, and of the three output encoders. A positional encoding is added to the input at the beginning of each encoder layer consisting of sin and cos functions at varying wavelengths, as defined in (Vaswani et al., 2017a). Each sub-layer after the positional encoding (one of convolution, self-attention, or feed-forward-net) inside the encoder structure is wrapped inside a residual block.

Referring specifically to FIG. 2A, it has been found that the final layer of each one of the recurrent projective and convolutional projective readers (designated by numeral 152) can be modified to permit selection of an answer among a set of candidates, rather than merely pointing the answer directly into a corresponding source document.

Pursuant to implementing the subject machine reading model 101, shown in FIG. 1, alternative approaches, other than the recurrent projective and convolutional projective readers, have been explored. In one example, the machine reading model was implemented with a basic long short-term memory ("LSTM") which, unlike standard feedforward neural networks, possesses feedback connections. In one common form, an LSTM is composed of a cell, an input gate, an output gate and a forget gate. The cell remembers values over arbitrary time intervals and the three gates regulate the flow of information into and out of the cell.

In another example, a neural network with a recurrent attention model over a possibly large external memory, known as "MemN2N" is employed. As is known, the corresponding MemN2N architecture assumes the form of a memory network that is trained end-to-end, and hence requires significantly less supervision during training. MemN2N can also be seen as an extension of RNNsearch to the case where multiple computational steps (hops) are performed per output symbol.

As shown in FIG. 1 by way of example, client device 11e has stored in memory 13e one or more document data items (or input text spans) 20 and questions 22 to be answered (or input questions), and the second server 10b has stored in memory 13b machine reading model 101 (or neural network). In alternative embodiments, documents concerning data items (or input text spans) may be retrieved based on questions 22 from client equipment 11 to be answered (or the input question) using a search engine that queries a general or a specific database.

In the case of closed questions with a given set of possible answers, the output layer is also called projective head. This projective head is added on top of the attention layers and output the answer to the question as a word from an answer vocabulary, the word being represented as a one-hot vector having the same size as the vocabulary.

C. Consistency Loss Functions

To improve the performance of machine reading models for question answering, the disclosed methods for training and using machine reading models 101 includes the integration of binary and scalar consistency loss functions. These types of loss functions aim at improving the reasoning capacities of the machine reading models 101 by forcing them to produce coherent answers when given two relational questions (i.e., two questions having different meaning but where most of the words are the same).

To summarize, the disclosed methods train machine reading models 101 with two types of consistency loss functions that are differentiable to optimize the coherence of the models. Specifically, these two loss functions are used in combination with a cross entropy loss function computed on an answer given by the model in the output vocabulary. Those skilled in the art will appreciate that a categorical cross entropy loss function measures the performance of a classification model whose output is a one-hot vector representing probability value between 0 and 1 for each possible label, and that this loss increases as the outputted one-hot vector diverges from the actual label. Advantageously, the generalization capabilities for question answering when given data where relational questions are present, as well as, the general accuracy of the machine reading models 101 improve when trained in this manner.

In the present disclosure, the consistency loss functions are described using the notation set forth in Table 2.

TABLE 2

| Notation | Meaning |
| --- | --- |
| $D = \{d_1; \ldots; d_n\}$ | a document d composed with n words |
| $Q = \{q_1; \ldots; q_m\}$ | a query q with m words |
| $A = \{a_1; \ldots; a_k\}$ | an answer a from a given vocabulary output by a machine reading model |
| V | the size of the output vocabulary (i.e., the number of possible answers) |
| $\{d_i, q^1_i, q^2_i\}$, $i \in [0, N]$ | training examples are represented as triplets composed with a document d associated with pairs $\{q^1, q^2\}$ of binary linked questions, where N is the total number of pairs of relational questions, also referred to as the size of the training dataset |

Figure 3:
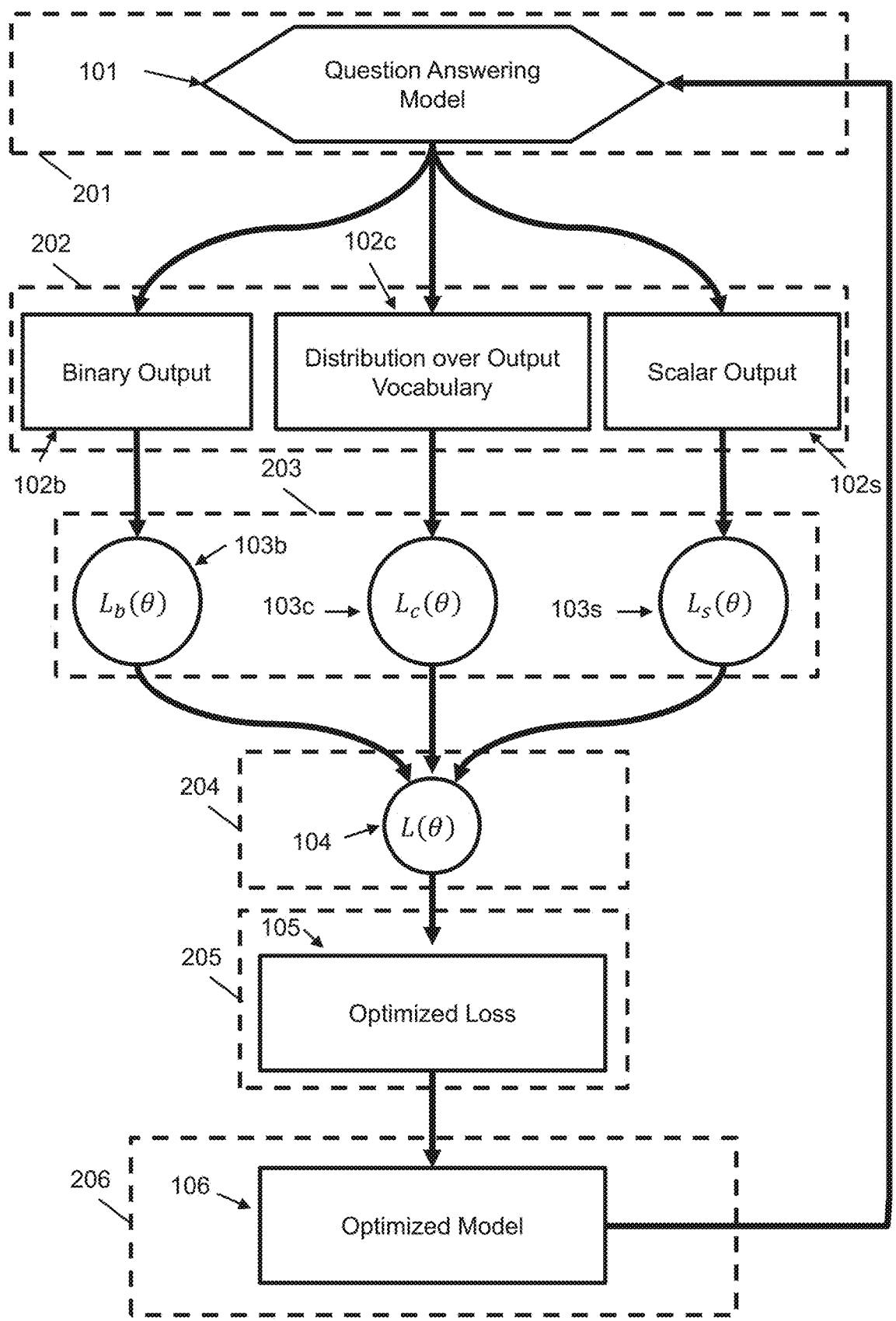
FIG. 3 illustrates a flow diagram of a first embodiment of a method for training machine reading models for question answering using a relational loss function.

FIG. 3 illustrates a first embodiment of a flow diagram of a method (e.g., performed by processor 12b of server 10b) for training machine reading model 101 (e.g., stored in memory 13b) for question answering using relational loss functions. At 201, questions are processed using a machine reading model for question answering 101. At 202, output predictions of the machine reading model are computed using a binary output 102b, a distribution over output vocabulary 102c, and a scalar output 102s. More specifically, at 202, the output vocabulary 102c may be a binary output vocabulary comprising, for example, the two words "yes" and "no" or "true" and "false" encoded as one-hot vectors, and the scalar output 102s may be integer values representing, for example, a rating out of 5.

At 203, a binary consistency loss function $L_b(\theta)$ (103b), a categorical cross entropy loss function $L_c(\theta)$ (103c), and a scalar loss function $L_s(\theta)$ (103s) are computed that are associated with each output of the model 102b, 102c, and 102s, respectively. At 204, the loss functions 103b, 103c and 103s are combined to produce final loss term $L(\theta)$ (104). At 205, the final loss term $L(\theta)$ (104) is optimized to produce an optimized loss term 105. At 206, the optimized loss 105 is used to compute optimized model 106, which is then used to update question answering model 101. In FIGS. 3, 201, 202, 203, 204, 205 and 206 may be repeated until the machine reading model 101 is fully trained.

Figure 4:
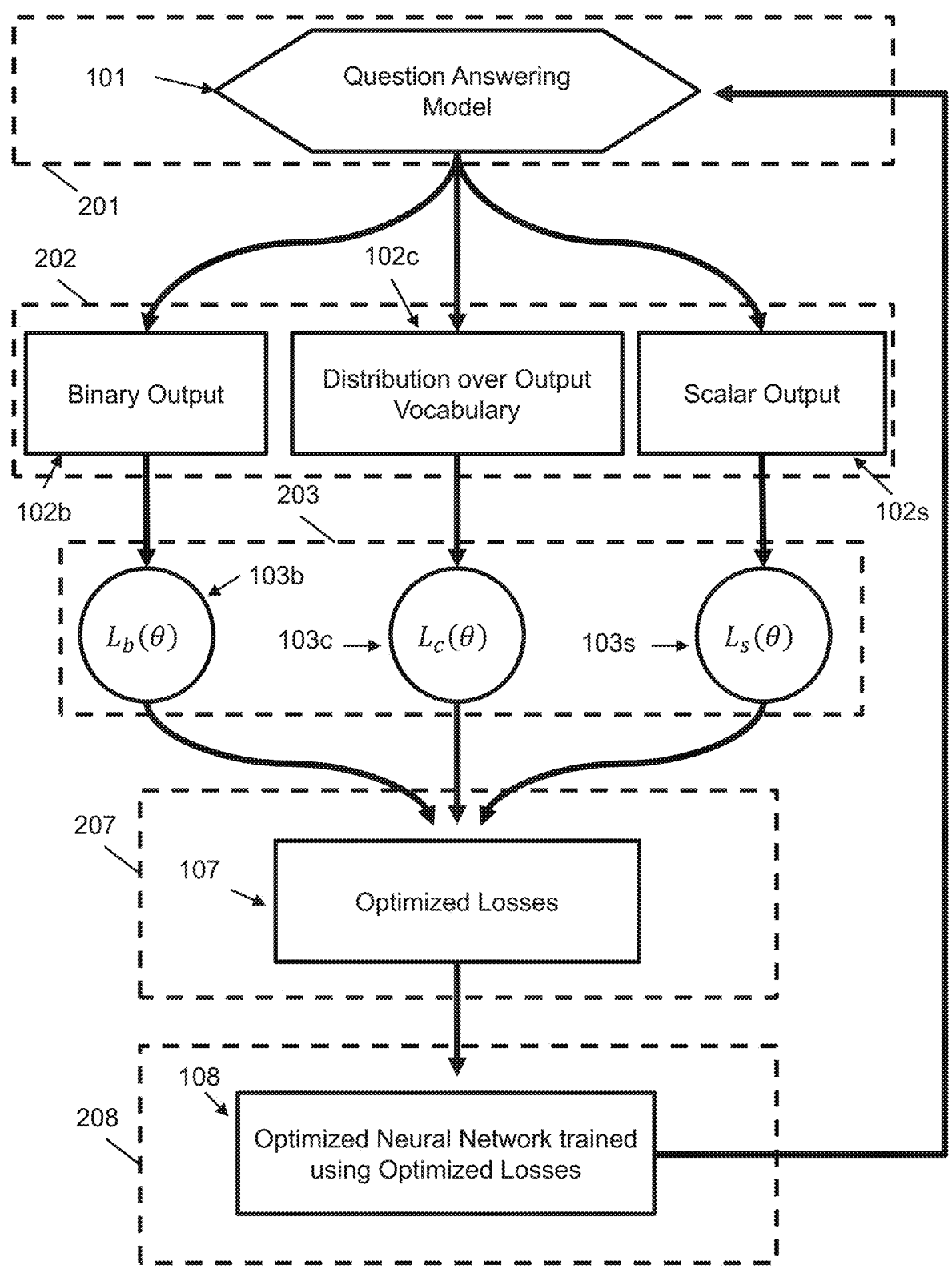
FIG. 4 illustrates a flow diagram of a second embodiment of a method for training machine reading models for question answering using a relational loss function.

FIG. 4 illustrates another embodiment of a flow diagram (e.g., performed by processor 12b of server 10b) for training machine reading model 101 (e.g., stored in memory 13b) for question answering using relational loss functions. Operations 201, 202 and 203 of FIG. 4 are equivalent to operations 201, 202, and 203 of FIG. 3. In FIG. 4, the binary consistency loss function $L_b(\theta)$ (103b), the categorical cross entropy loss function $L_c(\theta)$ (103c), and the scalar loss function $L_s(\theta)$ (103s) computed at 203 are optimized at 207 to generate optimized losses 107. In turn, at 208, the optimized losses 107 are used to train optimized neural network 108, which is then used to update question answering model 101. In FIGS. 4, 201, 202, 203, 207 and 208 may be repeated until the machine reading model 101 is fully trained.

D. Binary Consistency Loss Function

A first type of incoherence that may occur between two questions may be observed between two related binary questions. A binary question is defined as a question accepting a pair of antagonist answers. An example of such answers may be the {yes; no} pair. For instance, in the two following questions of ReviewQA: "Did the client rate service higher than cleanliness in this review?" and "Is service worse than cleanliness in this review?", two antagonist answers are expected. A model which would predict the same answer to these two questions, asked on the same document, would have an inconsistent behavior. A binary consistency loss function is introduced into the model to prevent this incoherence.

Following the notation set forth in Table 2, the probability distribution of answers over a binary vocabulary, produced by the model $\Phi_\theta$ is denoted as:

$\hat{a}_i^j = \Phi_\theta(d_i, q_i^j) \in \mathbb{R}^V, i \in [0,N], j \in \{1,2\}$.

The sum of probabilities of the first answer (for example a "yes" answer) and the second answer (for example a "no" answer) for $q^1$ and $q^2$ should be 1 for a coherent model. For instance, if the model answers "yes" to $q^1$ with a probability 0.7 and "no" with a probability of 0.3. It is expected from the model that, even if the answer is not correct, it answers "yes" and "no" with probabilities 0.3 and 0.7 respectively to the opposite question $q^2$. Then the binary consistency loss function $L_b(\theta)$ may given by:

$$L_b(\theta) = \sum_{n=1}^{N}\left[(\hat{a}_{n,k}^1 + \hat{a}_{n,k}^2) - 1\right]^2 + \left[(\hat{a}_{n,l}^1 + \hat{a}_{n,l}^2) - 1\right]^2,$$

where k is the index of the one-hot vector that represents the first answer (for example "yes") and l is the index of the one-hot vector that represents the second answer (for example "no").

E. Binary/Scalar Consistency Loss Function

A second type of incoherence that may occur between two questions may be observed between a scalar question and a binary question, where a scalar question is defined as a question that accepts a scalar value as an answer (e.g., a rating from 1 to 5). An example of a scalar and binary pair of questions may be the following questions of ReviewQA: "What is the rating of location?" and "Is the client satisfied with the location of this hotel?". In this case, the answer to a binary question is transformed into a scalar a $E\{-1,1\}$ and the scalar answers are centered around zero, for example in the case of a rating out of 5, the answer is shifted to be $a \in [-2.5, 2.5]$. As a result, the product of the answers of two relational question is expected to be positive. Thus, in the previous example of relational questions, if the answer to the question "Is the client satisfied with the location of this hotel?" is positive, i.e., the client is satisfied, a positive shifted rating is expected. Conversely, if the client is not satisfied, a negative shifted rating is expected.

Following the notation set forth in Table 2 and in contrast with the binary consistency loss function $L_b(\theta)$, the scalar prediction of the model $\Phi_\theta$ for the scalar consistency loss function $L_s(\theta)$ is denoted as:

$\hat{a}_i^j = \Phi_\theta(d_i, q_i^j) \in \mathbb{R}, i \in [0,N], j \in \{1,2\}$.

Then the scalar consistency loss function $L_s(\theta)$ may be given by:

$$L_s(\theta) = \sum_{n=1}^{N} \exp(-\hat{a}_n^1 \times \hat{a}_n^2).$$

F. Cross Entropy Loss Function

The cross entropy loss function $L_c(\theta)$ (103c) is calculated by server 10b on the output vocabulary of the model. In one embodiment, the cross entropy loss function $L_c(\theta)$ that is computed on the output 102c is given by:

$$L_c(\theta) = \sum_{x=1}^{N} p(x) \log q(x),$$

where $p(x)$ and $q(x)$ are probability distributions. Those skilled in the art will appreciate that alternative formulations may be given.

G. Integration with the Machine Reading Model

In one exemplary approach shown in FIG. 3 to training the machine reading model for question answering 101, the loss functions $L_b(\theta)$ (103b) and $L_s(\theta)$ (103s) are computed on the output 102b and 102s, respectively, of the machine reading model for question answering 101 and are integrated with the cross entropy loss function 103c $L_c(\theta)$ (103c) computed on output 102c. The final loss term $L(\theta)$ (104) of the question answering model 101 is computed by the server 10b as a linear combination of the cross entropy loss function $L_c(\theta)$ (103c), the binary consistency loss function $L_b(\theta)$ (103b), and the scalar consistency loss function $L_s(\theta)$ (103s) according the following linear combination:

$L(\theta) = \alpha_c \times L_c(\theta) + \alpha_b \times L_b(\theta) + \alpha_s \times L_s(\theta),$ where $\alpha_c$, $\alpha_b$, and $\alpha_s$ are hyperparameters tuned using a cross validation method.

In order to compute the two consistency loss functions 102*b* and 102*s*, additional outputs may be added to the machine reading model 101 for question answering in order to get an output that has the format required by the loss functions. However, these additional outputs are only needed for the training and do not require further modification of the model 101. Those skilled in the art would appreciate that such additional outputs may be added to known machine reading models for question answering trained using such relational questions. The addition of the consistency loss functions during training improves performance of the model 101 even though the practical use of the model 101 may not include using it on multiple question related to each other.

In another exemplary approach shown in FIG. 4, the above-described models are trained on the entire set of tasks for measuring the overall performance and accuracy for each individual task. Training at 208, optimized neural network 108 is performed with stochastic optimization at 207, employing "Adam," an algorithm for first-order gradient-based optimization of stochastic objective functions, based on adaptive estimates of lower-order moments to produce optimized losses 107. Training at 208 is further performed with a learning rate of 0.01 and a batch size of 64.

For the convolutional projective reader, filters overlapping seven words at a time are used. The dimension for both the projective readers and the LSTM model is 300.

For the MemN2N, 5 memory hops and a linear start of 5 epochs is used. Additionally, reviews are split by sentence, with each memory block corresponding to one sentence, and with each sentence being represented by its bag-of-word representation augmented with temporal encoding.

As indicted above, cross entropy loss can be calculated for use in optimizing coherence among the models using cross entropy loss function $L_c(\theta)$ (103*c*). Further coherence optimization is obtained through use of both a set of binary relational questions (including pairs of relational questions corresponding with binary answers) and a set of binary/scalar relational questions (including pairs of relational questions where each pair corresponds with a binary based answer and a scalar based question). As will be appreciated by those skilled in the art, each set of binary and binary/scalar relational questions can be generated by reference to Table 1 above and Appendix B attached to U.S. Provisional Patent Application Ser. No. 62/951,606, filed on Dec. 20, 2019, which is hereby incorporated herein by reference. In turn, binary relational loss and binary/scalar relational loss are computed respectively from the binary and binary/scalar relational questions in accordance with the binary consistency loss function $L_b(\theta)$ (103*b*) and binary/scalar consistency loss function $L_s(\theta)$ (103*s*) described above.

The binary and binary/scalar relational losses may be optimized successively, with the frequency of optimization being considered as a hyperparameter of a learning protocol. One efficient way to train the models is to optimize the binary relational loss every two epochs and the binary/scalar relational loss every four epochs.

Referring to Table 3 below, results corresponding with the performance of five baselines on ReviewQA's test set, plus the performance of two reading models regularized with the binary and binary/scalar relational losses, are shown:

TABLE 3

| Model Task | LogReg | LSTM | MemN2N | Recurrent Projective Reader | Convolutional Projective Reader | Recurrent Projective Reader (RT) | Convolutional Projective Reader (RT) |
|---|---|---|---|---|---|---|---|
| Overall | 46.7 | 19.5 | 20.7 | 60.4 | 55.3 | 63.2 | 57.9 |
| 1 | 51.0 | 20.0 | 23.2 | 82.3 | 77.5 | 83.5 | 79.3 |
| 2 | 80.6 | 65.3 | 70.3 | 90.9 | 86.3 | 93.0 | 90.2 |
| 3 | 72.2 | 58.1 | 61.4 | 85.9 | 80.0 | 87.2 | 81.3 |
| 4 | 58.4 | 28.1 | 28.0 | 91.3 | 85.1 | 93.0 | 86.7 |
| 5 | 37.8 | 6.1 | 5.2 | 57.1 | 51.5 | 59.3 | 53.8 |
| 6 | 16.0 | 8.3 | 10.1 | 39.1 | 33.8 | 40.2 | 35.0 |
| 7 | 57.2 | 12.8 | 13.2 | 68.8 | 67.8 | 72.0 | 70.5 |
| 8 | 36.8 | 18.0 | 17.8 | 41.3 | 35.5 | 42.3 | 38.3 |

The two projective readers achieved encouraging results on the ReviewQA dataset. They outperformed all the other baselines, especially on the first four tasks. These results demonstrate that optimizing the coherence of the models on the relational tasks improve significantly the global accuracy of the models. Indeed, an increase of 2.8 and 2.7 points of the overall performance for the two projective readers is observed. This improvement appears particularly noticeable for tasks 2 and 7 in Table 3, these tasks explicitly containing linked questions optimized with the binary and binary/scalar relational losses.

H. Runtime Use of the Neural Network Model

At runtime, the machine reading model for question answering 101 trained in accordance with the method shown in FIG. 3 or FIG. 4 produces answers based on input questions concerning input text spans. In the embodiments shown in FIG. 1, input questions are received over network 15 from client equipment 11 and processed by server 10*b* storing the trained question answering model 101. Once an answer is computed by server 10*b* for a question received from client equipment 11 using the model 101, the server 10*b* sends the answer to the client equipment over network 15.

I. General

Additional discussion related to the present disclosure is set forth in Appendix A and Appendix B attached to U.S. Provisional Patent Application Ser. No. 62/951,606, filed on Dec. 20, 2019, which are hereby incorporated herein by reference.

According to other innovative aspects of the subject matter described in this specification, a computer program product comprising code instructions and a computer-readable medium comprising instructions, which, when the program and instructions are executed by a computer, cause the computer to execute methods disclosed in this specification.

The apparatuses and methods described in this specification may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

Those of ordinary skill in the art will recognize various advantages following from the above description: (1) Training efficiency for a given neural network is improved by optimizing a machine reading model with differentiable consistency losses (e.g., a binary relational loss and a binary/scalar relational loss); (2) Optimization is facilitated by successively optimizing the differentiable consistency losses; (3) Performance results for improved machine reading models demonstrate that optimizing the coherence of the models on the relational tasks improve significantly the global accuracy of the models; (4) Performance of the machine reading model is further improved by use of a modified projective neural network; (5) Relational questions of the dataset can be used to regularize models by maximizing their coherence during training; and (5) Functions are provided for facilitating computer generation of the differentiable consistency losses.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A computer implemented method for improving an efficiency of training of a question answering network, the question answering network including a neural network, comprising:
   accessing a dataset from a corpus, the dataset including a plurality of questions;
   wherein the dataset includes (a) a first set of questions having at least one pair of relational questions with each of the at least one pair of relational questions corresponding respectively with a pair of binary answers, and (b) a second set of questions including at least another pair of relational questions with each of the at least another pair of relational questions corresponding respectively with a binary answer and a scalar answer;
   using the question answering network to compute a relational loss for the at least one pair of relational questions;
   using the question answering network to compute a relational loss for the at least another pair of relational questions;
   optimizing both the relational loss for the at least one pair of relational questions and the relational loss for the at least another pair of relational questions; and
   training the neural network model with both the optimized relational loss for the at least one pair of relational questions and the optimized relational loss for the at least another pair of relational questions.

2. The computer implemented method of claim 1, wherein said optimizing includes successively optimizing the relational loss for the at least one pair of relational questions and the relational loss for the at least another pair of relational questions.

3. The computer implemented method of claim 2, wherein said successive optimizing includes successively optimizing the relational loss for the at least one pair of relational questions at a first frequency and optimizing the relational loss for the at least another pair of relational questions at a second frequency.

4. The computer implemented method of claim 1, wherein the relational loss for the at least one pair of relational questions is optimized after a first selected number of epochs and the relational loss for the at least another pair of relational questions is optimized after a second selected number of epochs.

5. The computer implemented method of claim 1, wherein the relational loss for the at least one pair of relational questions is computed with the following function:

$$L_b(\theta) = \sum_{n=1}^{N} [(\hat{a}_{n,k}^1 + \hat{a}_{n,k}^2) - 1]^2 + [(\hat{a}_{n,l}^1 + \hat{a}_{n,l}^2) - 1]^2,$$

with
$\hat{a}_i^j = \Phi_\theta(d_i, q_i^j) \in \mathbb{R}^V$, $i \in [0, N]$, $j \in \{1,2\}$ being the probability distribution of binary valued answers over an output vocabulary of size V produced by the binary consistency loss function, where:
N is the size of the training dataset,
$\Phi_\theta$ is the model,
$d_i$ is the i-th document of the training dataset,
$q_i^1$ and $q_i^2$ are the relational questions associated with document $d_i$,
k the index of the one-hot vector representing one value of the binary answer, and
l the index of the one-hot vector representing the other value of the binary answer.

6. The computer implemented method of claim 1, wherein the relational loss for the at least another pair of relational questions is computed with the following function:

$$L_s(\theta) = \sum_{n=1}^{N} \exp(-\hat{a}_n^1 \times \hat{a}_n^2),$$

with
$\hat{a}_i^j = \Phi_\theta(d_i, q_i^j) \in \mathbb{R}$, $i \in [0, N]$, $j \in \{1,2\}$ being the scalar prediction produced by the model, where:
N is the size of the training dataset,
$\Phi_\theta$ is the model,
$d_i$ is the i-th document of the training dataset,
$q_i^1$ and $q_i^2$ are the relational questions associated with document $d_i$.

7. The computer implemented method of claim 1, in which cross entropy loss is computed with respect to the question answering network, wherein said training is further optimized with the cross entropy loss.

8. The computer implemented method of claim 1, further comprising regularizing the question answering network with both the relational loss for the at least one pair of relational questions and the relational loss for the at least another pair of relational questions.

9. The computer implemented method of claim 1, wherein the neural network is adapted to a projective setting in which position selection heads are replaced by a projection over a selected answer space.

10. The computer implemented method of claim 9, wherein said training includes using at least one filter with the at least one filter successively overlapping a selected number of words.

11. A computer implemented method for training a machine reading model for question answering, the method comprising:
   (a) accessing a training dataset having both input questions and true answers;
   (b) processing the input questions using the machine reading model for question answering to compute first and second relational losses:
      (i) computing the first relational loss by evaluating the coherence between first pairs of relational input questions with each one of the first pairs of relational input questions including a pair of binary valued answers, and
      (ii) computing the second relational loss by evaluating the coherence between second pairs of relational questions with each one of the second pairs of relational input questions including a scalar valued answer and a binary valued answer; and
   (c) optimizing the machine reading model for question answering with the first and second relational losses.

12. The computer implemented method of claim 11, wherein said optimizing includes optimizing the first and second relational losses successively with the first relational loss being optimized at a first frequency and the second relational loss being optimized at a second frequency.

13. The computer implemented method of claim 11, wherein the first relational loss is computed with a binary consistency loss function $L_b(\theta)$, with $\theta$ parameters of the binary consistency loss function's model, the binary consistency loss function given by:

$$L_b(\theta) = \sum_{n=1}^{N} [(\hat{a}_{n,k}^1 + \hat{a}_{n,k}^2) - 1]^2 + [(\hat{a}_{n,l}^1 + \hat{a}_{n,l}^2) - 1]^2,$$

with $\hat{a}_i^j = \Phi_\theta(d_i, q_i^j) \in \mathbb{R}^V$, $i \in [0, N]$, $j \in \{1,2\}$ being the probability distribution of binary valued answers over an output vocabulary of size V produced by the binary consistency loss function, where:
N is the size of the training dataset,
$\Phi_\theta$ is the model,
$d_i$ is the i-th document of the training dataset,
$q_i^1$ and $q_i^2$ are the relational questions associated with document $d_i$,
k the index of the one-hot vector representing one value of the binary answer, and
l the index of the one-hot vector representing the other value of the binary answer.

14. The computer implemented method of claim 11, wherein the second relational loss function is computed with a binary/scalar consistency loss function $L_s(\theta)$, with $\theta$ parameters of the binary/scalar consistency loss function's model, the binary/scalar consistency loss function given by:

$$L_s(\theta) = \sum_{n=1}^{N} \exp(-\hat{a}_n^1 \times \hat{a}_n^2),$$

with $\hat{a}_i^j = \Phi_\theta(d_i, q_i^j) \in \mathbb{R}$, $i \in [0, N]$, $j \in \{1,2\}$ being the scalar prediction produced by the model, where:
N is the size of the training dataset,
$\Phi_\theta$ is the model,
$d_i$ is the i-th document of the training dataset,
$q_i^1$ and $q_i^2$ are the relational questions associated with document $d_i$.

15. The computer implemented method of claim 11, wherein said (b) further includes computing a cross entropy loss with respect to the machine reading model, and said (c) further includes optimizing the machine reading model with the first relational loss, second relational loss and the cross entropy loss.

16. The computer implemented method of claim 11, further comprising regularizing the machine reading model for question answering with the first and second relational losses.

17. A computer implemented method performed on a server communicating with a client device over a network, comprising:
   (A) receiving a runtime question from a client device;
   (B) receiving runtime documents concerning the runtime question;
   (C) computing runtime answers using a machine reading model for question answering; and
   (D) sending the runtime answer to the client device; and
   (E) wherein the machine reading model for question answering is trained in accordance with a method in which the machine reading model for question answering is optimized with both a first loss and a second loss, wherein (a) the first loss is computed by evaluating the coherence between at least one pair of relational questions where each relational question of the at least one pair of relational questions corresponds with a binary valued answer, and (b) the second loss is computed by evaluating the coherence between at least another pair of relational questions where one of the at least another pair of relational questions corresponds with a scalar valued answer and another of the at least another pair of relational questions corresponds with a binary valued answer.

18. The computer implemented method of claim 17, wherein the method in which the machine reading model for question answering is optimized with both first and second losses further includes optimizing the machine reading for question answering with a third loss, the third loss being computed for cross entropy loss with respect to the machine reading model for question answering.

19. The computer implemented method of claim 17, wherein the method in which the machine reading for question answering is optimized with both first and second losses is performed with a neural network adapted to a projective setting in which position selection heads are replaced by a projection over a selected answer space.

20. The computer implemented method of claim 17, wherein the method in which the machine reading for question answering is optimized with both first and second losses includes optimizing the first and second relational losses successively with the first relational loss being optimized at a first frequency and the second relational loss being optimized at a second frequency.

* * * * *